United States Patent [19]

Firth, Jr.

[11] 4,311,600
[45] * Jan. 19, 1982

[54] HUMATE THINNERS FOR DRILLING FLUIDS

[75] Inventor: William C. Firth, Jr., Robbinsville, N.J.

[73] Assignee: Union Camp Corporation, Wayne, N.J.

[*] Notice: The portion of the term of this patent subsequent to Nov. 25, 1997, has been disclaimed.

[21] Appl. No.: 209,498

[22] Filed: Nov. 24, 1980

Related U.S. Application Data

[63] Continuation-in-part of Ser. No. 894,026, Apr. 6, 1978, Pat. No. 4,235,727.

[51] Int. Cl.³ .................................................. C09K 7/02
[52] U.S. Cl. ................................... 252/8.5 C; 562/405
[58] Field of Search ............ 252/8.5 A, 8.5 C, 8.5 R; 562/407, 480, 405

[56] References Cited

U.S. PATENT DOCUMENTS

| | | | |
|---|---|---|---|
| 2,650,197 | 8/1953 | Rahn | 252/8.5 |
| 2,783,222 | 2/1957 | Rahn | 252/8.5 |
| 2,813,826 | 11/1957 | Crowley et al. | 252/8.5 |
| 3,079,334 | 2/1963 | Clem | 252/8.5 |
| 3,511,779 | 5/1970 | Browning et al. | 252/8.5 |
| 4,235,727 | 11/1980 | Firth | 252/8.5 |

OTHER PUBLICATIONS

Rogers, *Composition and Properties of Oil Well Drilling Fluids,* Published 1953, pp. 323 and 324.

*Primary Examiner*—Herbert B. Guynn
*Attorney, Agent, or Firm*—Kane, Dalsimer, Kane, Sullivan and Kurucz

[57] ABSTRACT

The disclosure is of the use of a particular humate to reduce the viscosity of water-based drilling fluids. The humate is usually found in association with titanium minerals and bears a unique compositional make-up. The composition is particularly advantageous as a drilling mud thinner, imparting high temperature stability to water-based drilling muds.

3 Claims, No Drawings

HUMATE THINNERS FOR DRILLING FLUIDS

CROSS-REFERENCE TO RELATED APPLICATION

This application is a continuation-in-part of my U.S. Patent Application Ser. No. 894,026 filed Apr. 6, 1978 and issued as U.S. Pat. No. 4,235,727.

BACKGROUND OF THE INVENTION

1. Field of the Invention

The invention relates to methods and compositions for reducing the viscosity of drilling mud compositions and more particularly relates to the use of humates to thin water-based drilling fluids.

2. Brief Description of the Prior Art

In drilling earth bores or wells, drilling fluids are circulated past the rotary drill bit to remove cuttings, lubricate the bit, seal and cool the bore formation. The procedure is not without certain difficulties. One difficulty is the encountering of certain formations such as gypsum, which "cuts" the drilling fluid to the point that components of the drilling fluid such as bentonite clays will flocculate. The fluid viscosity increases so that there is potential for damage to the rotary drill bit.

Another potential difficulty is encountered when the bore penetrates a heaving shale. A heaving shale absorbs water from the water-based drilling fluids, leaving the swollen bentonite clay component to close the bore around the drill string. Continued circulation of the drilling fluid is impaired and the drill string can seize.

In deep bores, relatively high drilling temperatures; eg. about 300° F. and higher are encountered. In that environment, water-based drilling fluids thicken and can gel. This of course impedes pumping of the fluid and increases pumping pressures required to circulate the drilling fluids. In some cases, circulation may become impossible. This high temperature instability of the water-based drilling fluid or mud may even be aggravated in the presence of fluid contaminants such as gypsum, salt, cement and like contaminants.

Heretofore, a wide variety of drilling fluid additives have been proposed to stabilize and/or reduce the viscosity of water-based drilling muds. Included in the list of such additives are humates and lignitic materials. Commercially, leonardite, believed to be a naturally oxidized lignite, has been used as a drilling fluid additive to stabilize and thin drilling fluids. Leonardite imparts high temperature stability to water-based drilling muds, particularly if the mud is thinned with a lignosulfonate additive.

We have now discovered that a particular, naturally occurring, humate composition of a unique compositional make-up related somewhat to but different from leonardite, will under some conditions, impart even greater high temperature stability to water-based drilling muds than previously obtainable with leonardite. In addition, on an equal dry weight basis the composition employed in the method of our invention is the equal of, or superior to, leonardite, and in some instances lignosulfonates, as viscosity reducing additives in water-based drilling fluids. Other advantages of the invention will be described more fully hereinafter.

SUMMARY OF THE INVENTION

The invention comprises a method of reducing the viscosity of a water-based drilling mud, which comprises;

providing a quantity of humate, said humate having been separated from association with titanium mineral deposits; and dispersing a viscosity reducing proportion of the humate in the water-based drilling mud.

The invention also comprises, in a water-based drilling fluid composition, the improvement which comprises a viscosity reducing proportion of a humate, said humate having been associated with a titanium mineral deposit.

The terms "drilling fluid" and "drilling muds" or simply "muds" as used herein refer to well known aqueous suspensions of solids, employed to facilitate the rotary drilling of bores or wells in the earth.

The term "humate" as used throughout the specification and claims refers to the products of natural flocculation or precipitation in sand deposits, of humic substances that were derived from natural leaching of decaying plant and animal material (humus). The humate employed in the method and compositions of the invention are generally found in association with titanium mineral deposits and contain humic substances which may be the active ingredients in the reduction of the viscosity of drilling muds.

The phase "humate in association with titanium mineral deposits" as used throughout the specification and claims means a humate, initially found in association with titanium mineral deposits and at least partially separated therefrom for use in the method of the present invention. Titanium mineral deposits include for example, ilmenite and rutile sand deposits.

The term "humic acid" has been widely applied to acidic solids obtained from plant decompositions. More recently, humic acids have been regarded as the intermediate product or products which result in the conversion of lignin and other plant materials to hard coal. It is believed that in the decomposition of vegetable matter, that the portion of the cell wall material consisting largely of lignin is converted into humus. In time, the humus may be converted progressively to peat, brown coal, bituminuous coal and finally into anthracite. More usually, "humic substance" is applied as a generic term for the organic acids derived from humus or the top layer of the soil, containing organic decomposition products of vegetation and animal organisms in admixture with inorganic compounds, sands, minerals, metal hydroxide bases etc. The chemical structure of the humic acids has not been established, but they are believed to be large condensed ring, polymer like molecules containing pendant carboxylic and phenolic groups. Depending on their solubilities, humic substances are usually classified as humic acid, Fulvic acid, hymatomelanic acid or humin.

The term "leonardite" has been used above and will be employed again hereinafter. The term refers to a coal-like substance similar in structure and composition to lignite. It has been considered to be a naturally oxidized lignite. Leonardite is a specific organic material named after A. G. Leonard who was associated with its identification. Leonardite is primarily mined from the Harmon bed in Bowman County, and Divide County in North Dakota and in and around Alpine, Texas. The significant elemental difference between leonardite and lignite is its oxygen content. Leonardite has an oxygen content on the order of 28 to 29%, whereas lignite has a much lower oxygen content of from 19 to 20%, on an ash and moisture free basis. Unfortunately, in common use leonardite has been oftentimes called a lignite. Thus, those skilled in the drilling arts often describe a viscosity lowering additive as "lignin", "mined lignin" or "lignite" when they actually mean the preferred additive "leonardite". Leonardite is preferred as a viscosity reducing agent in water-based drilling muds as opposed to lignite, because of its higher oxygen content and the functional advantages which are apparently related to the higher oxygen content. Leonardite is compositionally most analogous to the humate material employed in the method and compositions of the present invention. Accordingly, comparative studies, as herein presented, were made against leonardite to determine the previously described advantages of the invention.

DETAILED DESCRIPTION OF THE INVENTION

Water-based drilling fluids or muds are well-known aqueous suspension compositions, commonly referred to as "drilling muds" or more simply as "muds". Depending on the salinity of the water phase, they may be further described as "fresh water muds" or "salt water muds". The suspended solids portions of the muds are, aside from added clays and barite, fundamentally made up of shale, anhydrite, gypsum, dolomite, limestone, and sand. Salts may also be present. Hydrophilic chemicals, both solid and liquid may be added to adjust and control viscosity, gelation, lubrication, filtration, corrosion, contamination, water loss, etc. Portions of oils such as petroleum distillates may be added to form emulsions. Desirably, to promote pumpability and flow characteristics, the viscosity of the mud is held to a minimum, without obviating the gel strength of the mud. Viscosity reduction or "thinning" can occur by reducing the apparent viscosity, the yield point, the rate and degree of gelation or all three of these factors. In the present invention, viscosity is reduced by the addition of a very particular humate composition, with consequent advantages in high temperature stability of the drilling mud. Many of the known water-based drilling muds may be thinned advantageously by the method of the invention.

The humate compositions employed in the invention are naturally occurring compositions of matter found in association with titanium mineral deposits such as rutile sand deposits. Rutile sand deposits are found in several places throughout the world. In the United States rutile sand deposits are located in Florida, Georgia and South Carolina. The rutile sands are in a formation commonly referred to as "hard pan". The hard pan comprises rutile sands bound together by a coating of humate. It is this humate which is employed in the present invention.

The desired humate may be separated from the rutile sand deposits by first breaking up the deposit formation of hard pan into a ground ore of a convenient size for handling. Much of the humate in the ground ore can be washed off with water to effect the desired separation. Additional humate can be obtained by washing the concentrated ore with aqueous sodium hydroxide. The aqueous mixture containing the free humates may then be treated with, for example, a strong mineral acid such as sulfuric acid or alum to regain the natural pH of the humate and facilitate settling out of the suspended humate. The separated humate may then be dried in the sunlight or by artificial means. The separated humate is unique, compositionally, and differs significantly from leonardite in compositional make-up. For comparative purposes, the following Tables 1-3 show the elemental composition, functional group content and metal content of a humate composition separated from a rutile sand deposit, in comparison to four commercially available leonardites.

TABLE 1
COMPOSITION

| | Elemental Composition (Dry Basis) (%) | | | | Ash "As Is" | Composition, Wt. % (Dry Basis) | |
|---|---|---|---|---|---|---|---|
| C | C | H | O | S | Moisture | Ash | Ash |
| Rutile Sand Humate | 38.01 | 2.38 | 25.29 | 0.58 | 3.90 | 32.85 | 34.18 |
| Commercial Leonardite A | 50.61 | 2.80 | 19.83 | 1.15 | 15.50 | 16.87 | 19.96 |
| Commercial Leonardite B | 55.42 | 2.82 | 23.15 | 1.34 | 14.81 | 15.86 | 18.61 |
| Commercial Leonardite C | 54.17 | 2.84 | 21.86 | 1.60 | 13.56 | 17.00 | 19.67 |
| Commercial Leonardite D | 52.81 | 2.94 | 23.43 | 1.47 | 13.19 | 19.06 | 21.96 |

TABLE 2
FUNCTIONAL GROUP CONTENT* AND C:H AND C:O RATIOS

| | Functional Group Contents (Dry Basis) meq/g | | Ratios, Wt./Wt. (Dry Basis) | |
|---|---|---|---|---|
| | Total Acidity | Carboxylic Acid | C:H | C:O |
| Rutile Sand Humate | 6.1 | 2.2 | 16.0:1 | 1.5:1 |
| Commercial Leonardite A | 5.3 | 1.8 | 18.1:1 | 2.6:1 |
| Commercial Leonardite B | 6.0 | 1.8 | 19.6:1 | 2.4:1 |
| Commercial Leonardite C | 5.2 | 1.5 | 19.1:1 | 2.5:1 |
| Commercial Leonardite D | 5.1 | 1.5 | 18.0:1 | 2.2:1 |

*Methods for the functional group analysis may be found in M. Schnitzer and S. U. Khan, "Humic Substances in the Environment," Marcel Dekker, Inc., New York, New York, 1972, pp. 39-41. The barium hydroxide method for total acidity and calcium acetate method for carboxylic acid groups described in the citation were used.

TABLE 3
METAL CONTENT

| | Metal Contents (Dry Basis) (%) | | | |
|---|---|---|---|---|
| | Al | Ti | Fe | Ca |
| Rutile Sand Humate | 5.6 | 0.85 | 0.9 | 0.06 |
| Commercial Leonardite A | 0.8 | 0.06 | 1.1 | 2.4 |
| Commercial Leonardite B | 0.9 | 0.04 | 1.6 | 2.6 |
| Commercial Leonardite C | 0.8 | 0.05 | 1.6 | 2.4 |
| Commercial Leonardite D | 0.9 | 0.06 | 1.8 | 2.7 |

Another titanium mineral deposit from which associated humate may be separated and used in the method of the invention are deposits of ilmenite. Ilmenite and associated minerals are found extensively in the United States in such areas as the Adirondack mountains of New York State, California, Wyoming, Minnesota and Rhode Island. A principal deposit is located at Trail Ridge, Florida. The humate is separated from ilmenite deposits in a manner similar to that used to separate humate from rutile sand deposits. For comparative purposes, the following Table 4 shows the elemental composition and metal content of a humate composition separated from an ilmenite deposit.

TABLE 4

| Element | Composition (%) |
|---|---|
| C | 45.21 |
| H | 3.25 |
| O | 23.75 |
| S | 0.30 |
| ash | 23.99 |
| Ti | 0.61 |
| Zr | 0.014 |
| Al | 5.34 |
| Fe | 0.46 |
| Ca | 0.007 |
| C/O ratio | 1.9:1.0 |
| C/H ratio | 13.9:1.0 |

It will be appreciated that the above analysis is for specific materials and the compositional make-up may vary somewhat for different materials within the same ore body. In general the humate compositions employed in the method of the invention have compositional make-ups which provide a carbon to hydrogen ratio (weight to weight) of from 9.5–17.5:1.0; a carbon to oxygen ratio of 1.0–2.3:1.0: an aluminum content of 2.8 to 8.4 percent by weight, a titanium content of 0.5 to 3.5 percent by weight and a calcium content of less than 0.5 percent by weight.

It will be appreciated from the above comparison that the humate associated with titanium mineral deposits bears some resemblance in compositional make-up to leonardite. However, it contains substantially larger proportions of some metals, particularly aluminum and titanium, as well as lower C/H and C/O ratios. There is also a lower calcium content. Although applicant does not wish to be bound by any theory of operation, it is believed that these compositional differences over leonardite account for the functional advantages associated with the compositions of the present invention, in comparison to leonardite as a drilling mud thinner. The relatively high content of aluminum and titanium suggest that the chemical make-up of the humate employed in the method of the invention may include organotitanium and organoaluminum compounds which exert some beneficial effect when present in drilling muds.

In addition, the relatively low C/H and C/O ratios of humate compared to the leonardites indicate the presence of relatively more highly oxygenated compounds in humate.

The humate material of this invention may also be chemically (and physically) modified for improved performance as a drilling mud additive. For example, it can be treated with sulfite, bisulfite or sulfur dioxide in an alkaline medium to increase its solubility in water. The invention includes such chemically modified humate compositions.

The method of the invention is carried out by providing the above described humate, separated from its association with titanium mineral deposits and dispersing a viscosity reducing proportion of the humate in a water-based drilling mud. Dispersion may be carried out employing conventional mixing and agitating equipment, employed conventionally for dispersing like additives in drilling mud compositions. The proportion of humate dispersed in the drilling mud may be varied over a wide range, i.e.; from about 0.05% to about 6.5% by weight of the drilling mud (dry weight of humate/wet weight of drilling mud).

It will be appreciated by those skilled in the art that specific proportions employed may depend upon conditions encountered in the drilling of the well and may be varied. For example, as the drilling of the bore or well progresses and becomes deeper, temperatures in the well will increase, requiring different proportions of additive. Further, if the drilling fluid becomes contaminated during drilling of the well, more additive may be required to counteract the effects of the contamination. Clearly, a specific proportion of additive may be varied depending upon the drilling conditions. It can be stated however that normally the proportion will be within the range of from about 0.25 to about 25 preferably 1 to about 15 and most preferably 1 to about 10 lbs. per barrel of drilling mud. The term "barrel" as used herein refers to a barrel of 42 standard U.S. gallons.

The following examples describe the manner and process of making and using the invention and set forth the best mode contemplated by the inventor of carrying out the invention but are not to be construed as limiting. The physical test data presented was obtained using procedures specified by API (American Petroleum Institute) RP 13B, "Standard Procedure for Testing Drilling Fluids", and Appendix A, API RP 29, 4th EDN, "Suggested Procedures for Laboratory Evaluation of Drilling Mud Materials".

A Fann viscometer (Model No. 35A) was used to determine the apparent viscosity, plastic viscosity, yield point, 10-second gel strength and 10-minute gel strengths. Commercially available drilling mud testing equipment was used for the A.P.I. filtrate and high temperature/high pressure filtrate determinations. The amounts of additives in the examples are on a moisture free basis.

Preparation of base mud No. 1

The mud formulation is:
4200 ml distilled water
10.44 g sodium chloride
21.00 g calcium carbonate
120.00 g Dixie Bond clay
180.00 g Wyoming Bentonite
252.00 g Imco-Klay The salt and calcium carbonate are added to the water and stirred with a Lightnin Model 10 stirrer at about 1700 rpm for five minutes. The clays are sprinkled onto the stirred mixture in the order given above, over 15 minutes. The entire batch is stirred for one hour more. The mud is aged for at least 24 hours before use. If more mud is needed additional batches are prepared using the above formulation and then combined.

After aging, the base mud is rehomogenized by shaking before portions are taken for treatment with additives.

EXAMPLE 1

A portion (350 ml) of the base mud prepared as above is charged to each of four appropriate mixing vessels, identified by the symbols A through D. To vessel A there is added a commercial lignosulfonate drilling mud additive. To vessel B, there is added a commercial leonardite drilling mud additive having the composition of Leonardite A in Tables 1–3, supra. To vessel C there is added humate obtained from the rutile sand deposits in the vicinity of Green Cove Springs, Fla., and having the composition of the rutile sand humate shown in Tables 1-3, supra. Vessel D receives no additive and serves as a control.

Each sample of base mud is stirred with a standard Hamilton Beach mixer which is connected to a continuously variable motor speed controller. The stirring speed is measured with a phototachometer and adjusted to 13,000 rpm under load during the formulation procedure. The base mud is stirred for 2.5 minutes, and the additive when used is added over the next 2.5 minutes. Stirring is continued for an additional 2.5 minutes. Then a calculated amount of distilled water is added so that the amount of water added to each sample, including that added in the additive and as sodium hydroxide solution, is a constant 11.1 ml per 350 ml of base mud for each sample. For Vessels A-C this is followed by 4.0 ml of sodium hydroxide solution containing 1.0 g of sodium hydroxide per ml. Vessel D receives 9.1 ml of distilled water and 2.0 ml of the sodium hydroxide solution. Stirring is continued so that each sample is stirred for a total of 15 minutes at 13,000 rpm.

Because of the heat of stirring and reaction each sample is immediately cooled to 75° F. before the initial viscosity data is obtained.

The samples are then transferred to high temperature/high pressure aging cells, pressurized to 100 psi with nitrogen and rolled in a roller oven for 16 hours at 300° F. At the end of this period the mixtures are cooled to room temperature, restirred for five minutes at 13,000 rpm, quickly adjusted to 75° F. and viscosities and gel strengths determined. Portions of the mixtures for the A.P.I. filtration test (at room temperature) and HTHP (high temperature/high pressure) filtration test (300° F., 600 psi on cell, 100 psi on back pressure receiver) are restirred for one minute and ten minutes, respectively, just before the tests are run.

The test results are shown in Table 5 below, under "Heat Aging Results" (HA).

TABLE 5

|  | Vessel A (Lignosulfonate) | | Vessel B (Leonardite) | | Vessel C (Humate) | | Vessel D (Control) | |
| --- | --- | --- | --- | --- | --- | --- | --- | --- |
|  | Initial | HA | Initial | HA | Initial | HA | Initial | HA |
| Apparent viscosity (cps) | 28 | 26 | 21 | 45 | 19 | 24 | Too Thick To Test | 37 |
| Plastic viscosity (cps) | 20 | 21 | 16 | 32 | 14 | 19 | " | 24 |
| Yield point (lbs./100 ft. sq.) | 14 | 11 | 10 | 25 | 10 | 9 | " | 26 |
| Ten second gel strength (16/100 ft. sq.) | 19 | 4 | 9 | 13 | 3 | 3 | " | 4 |
| Ten minute gel strength (lbs./100 ft. sq.) | 95 | 31 | 44 | 48 | 55 | 25 | " | 240 |
| API Filtrate (ml) | — | 9.7 | — | 9.7 | — | 9.4 | " | 14.1 |
| HTPH Filtrate (ml) | — | 31.2 | — | 33.4 | — | 34.0 | " | 39.2 |
| pH | 11.7 | 8.6 | 11.7 | 8.4 | 11.5 | 8.3 | 11.7 | 9.9 |

Since low values of apparent viscosity, yield point and gel strengths are desirable in a drilling mud, it will be appreciated from Table 5 that the stability of the heat aged muds was considerably increased with the use of the humate material over the leonardite additive. Low values of filtrates are also desirable. In filtration tests humate gave results similar to lignosulfonate and lignite.

EXAMPLE 2

Repeating the procedure of Example 1, supra., but heat-ageing at 150° F. instead of at 300° F. as in Example 1, and employing unpressurized mason jars instead of high temperature cells as used in Example 1, the following test results are obtained for the heat-aged muds.

|  | Vessel A (Lignosulfonate) | Vessel B (Leonardite) | Vessel C Humate | Vessel D (Control) |
| --- | --- | --- | --- | --- |
| Apparent viscosity (cps) | 13 | 29 | 15 | 26 |
| Plastic viscosity (cps) | 12 | 24 | 12 | 18 |
| Yield point (lbs./100 ft. sq.) | 2 | 11 | 4 | 17 |
| Ten second gel strength (lbs/100 ft. sq.) | 1 | 4 | 1 | 7 |
| Ten minute gel strength (lbs./100 ft. sq.) | 1 | 37 | 8 | 125 |
| API Filtrate (ml) | 8.6 | 9.0 | 10.4 | 11.0 |
| pH | 9.8 | 10.4 | 10.0 | 10.5 |

From the above table, it will be seen that the method of the invention provides lower yield points, lower apparent viscosity and lower gel strengths in comparison to leonardite treated drilling mud.

Similarly, repeating the above procedure of Examples 1 and 2, but replacing the humate as used therein with a like humate once associated with rutile sands and having a carbon to hydrogen ratio of from 9.5-17.5:1.0; a carbon to oxygen ratio of 1.0-2.3:1.0; an aluminum content of 2.8 to 8.4 percent by weight, a titanium content of 0.5-3.5 percent by weight and a calcium content of less than 0.5 percent by weight, similar results are obtained.

Another base mud, is prepared as follows:

Base Mud No. 2

A base mud is prepared, using 25 lb/bbl of bentonite and 60 lb/bbl of Rev-Dust. The mud is mixed thoroughly with a Premier Dispersator and allowed to stand for several days to allow the bentonite to fully hydrate.

EXAMPLE 3

A portion (350 ml) of the base mud No. 2 prepared as above is charged to each of five appropriate mixing vessels, identified by the symbols J-N. Vessel E is a control and receives no additive, but to the vessels K-N there is added varying concentrations (proportions) of humate having the composition of the ilmenite derived humate given in Table 4, supra and a moisture content of 0.87 percent. Addition is accompanied with stirring on a multi-mixer. Each mud with additive is allowed to stir for 15 minutes and then caustic soda is added to adjust the pH of the mixture to 10.0. The resulting mixtures are subjected to testing for their rheological and filtration properties.

The muds are then placed in a roller oven and rolled at 150° F. for 16 hours, cooled to room temperature and tested again. Before the second tests are made, the pH is adjusted to about 10.0 with caustic soda.

After hot rolling, selected concentrations (5 lb/bbl and 10 lb/bbl) and a blank are static aged at 300° F. and 100 psi of $N_2$ for 16 hours. These are tested again after cooling to room temperature and adjusting the pH to 10.0.

The test results are shown in Table 6, below.

TABLE 6

| VESSEL | J | | | K | | L | | M | | | N | |
|---|---|---|---|---|---|---|---|---|---|---|---|---|
| Sample Concentration, lb/bbl | 0 | | | 1 | | 3 | | 5 | | | 10 | |
| Caustic Soda, lb/bbl | 0 | 0 | 0 | 0.5 | 0.2 | 0.5 | 0.2 | 0.5 | 0.2 | 0.4 | 1.0 | 0.3 | 0.7 |
| MUD PROPERTIES | 1 | HR | SA | 1 | HR | 1 | HR | 1 | HR | SA | 1 | HR | SA |
| Fann VG Meter Readings: | | | | | | | | | | | | | |
| 600 rpm | 76 | 163 | 126 | 94 | 198 | 87 | 127 | 86 | 109 | 93 | 98 | 111 | 104 |
| 300 rpm | 58 | 122 | 95 | 64 | 130 | 61 | 80 | 58 | 65 | 55 | 63 | 66 | 59 |
| 200 rpm | 52 | 103 | 84 | 58 | 101 | 50 | 61 | 49 | 48 | 41 | 48 | 50 | 43 |
| 100 rpm | 45 | 81 | 70 | 48 | 66 | 38 | 40 | 37 | 29 | 24 | 30 | 39 | 24 |
| 6 rpm | 34 | 58 | 48 | 42 | 18 | 27 | 12 | 24 | 5 | 4 | 6 | 5 | 2 |
| 3 rpm | 34 | 58 | 48 | 40 | 18 | 27 | 12 | 20 | 4 | 3 | 5 | 3 | 1 |
| Apparent Viscosity, cp | 36 | 81.5 | 63 | 47 | 99 | 43.5 | 63.5 | 43 | 54.5 | 46.5 | 49 | 55.5 | 52 |
| Plastic Viscosity, cp | 18 | 41 | 31 | 30 | 68 | 26 | 47 | 28 | 44 | 38 | 35 | 45 | 45 |
| Yield Point, lb/100 sq. ft. | 40 | 81 | 64 | 34 | 62 | 35 | 33 | 30 | 21 | 17 | 28 | 21 | 14 |
| 10-sec Gel. lb/100 sq. ft. | 42 | 54 | 50 | 52 | 24 | 39 | 14 | 34 | 4 | 4 | 7 | 4 | 2 |
| 10-min Gel. lb/100 sq. ft. | 58 | 87 | 74 | 100 | 100 | 87 | 56 | 75 | 42 | 42 | 73 | 24 | 2 |
| pH, initial | 8.5 | 7.9 | 7.7 | 10.2 | 8.0 | 9.9 | 7.5 | 10.0 | 7.3 | 6.5 | 9.9 | 6.7 | 6.1 |
| pH, adjusted | — | — | — | — | 10.3 | — | 10.0 | — | 10.1 | 10.1 | — | 10.1 | 10.2 |
| API Filtrate, ml | 11.0 | 12.2 | 12.2 | 9.4 | 9.9 | 9.0 | 9.2 | 9.3 | 8.8 | 7.6 | 8.6 | 8.1 | 7.0 |
| Filtrate Color | CL | CL | CL | VLG | A | LG | DA | LA | VDA | VDA | DA | VDA | VDA |
| Cake Thickness, 32nd. In. | 2 | 3 | 3 | 2 | 4 | 2 | 2 | 2 | 2 | 1 | 2 | 1 | 1 |
| Shear Strength, lb/100 sq. ft. | — | — | 260 | — | — | — | — | — | — | 160 | — | — | 70 |

1 - Properties measured initially
HR - Properties measured after rolling at 150° F. for 16 hours
SA - Properties measured after static aging at 300° F. for 16 hours
CL - Clear
G - Golden
A - Amber
DA - Dark Amber
V - Very
L - Light The static aged tests demonstrated an effectiveness for this thinner. The shear strengths were steadily lowered, demonstrating a reduction in the tendency toward mud solidification under these conditions.

EXAMPLE 4

The procedure of Example 3, supra., is repeated except that the humate additive employed has a moisture content of 22.17 percent. The test results are given in Table 7, below, the vessels being identified by the letters E–I.

TABLE 7

| VESSEL | E | | | F | | G | | H | | | I | |
|---|---|---|---|---|---|---|---|---|---|---|---|---|
| Additive Concentration lb/bbl | 0 | | | 1 | | 3 | | 5 | | | 10 | |
| Caustic Soda, lb/bbl | 0 | 0 | 0 | 0.4 | 0.2 | 0.5 | 0.3 | 0.6 | 0.5 | 0.3 | 1.0 | 0.9 | 0.5 |
| MUD PROPERTIES | 1 | HR | SA | 1 | HR | 1 | HR | 1 | HR | SA | 1 | HR | SA |
| Fann VG Meter Readings: | | | | | | | | | | | | | |
| 600 rpm | 76 | 163 | 126 | 82 | 215 | 79 | 139 | 78 | 122 | 92 | 80 | 130 | 95 |
| 300 rpm | 58 | 122 | 95 | 63 | 145 | 55 | 89 | 57 | 78 | 58 | 55 | 75 | 55 |
| 200 rpm | 52 | 103 | 84 | 53 | 115 | — | 77 | — | 57 | 44 | — | 55 | 41 |
| 100 rpm | 45 | 81 | 70 | 42 | 75 | — | 43 | — | 35 | 27 | — | 33 | 24 |
| 6 rpm | 34 | 58 | 48 | 25 | 17 | — | 17 | — | 8 | 4 | — | 5 | 5 |
| 3 rpm | 34 | 58 | 48 | 22 | 17 | — | 15 | — | 5 | 4 | — | 4 | 5 |
| Apparent Viscosity, cp | 36 | 81.5 | 63 | 41 | 107.5 | 39.5 | 69.5 | 39 | 61 | 46 | 40 | 65 | 47.5 |
| Plastic Viscosity, cp | 18 | 41 | 31 | 19 | 70 | 24 | 50 | 21 | 44 | 34 | 25 | 55 | 40 |
| Yield Point, lb/100 sq. ft. | 40 | 81 | 64 | 44 | 75 | 31 | 39 | 36 | 34 | 24 | 30 | 20 | 15 |
| 10-sec Gel. lb/100 sq. ft. | 42 | 54 | 50 | 50 | 19 | 75 | 20 | 150 | 10 | 6 | 25 | 7 | 5 |
| 10-min Gel. lb/100 sq. ft. | 58 | 87 | 74 | 143 | 81 | 110 | 57 | 180 | 85 | 47 | 145 | 22 | 15 |
| pH, initial | 8.5 | 7.9 | 7.7 | 10.2 | 8.1 | 10.0 | 7.4 | 10.0 | 7.0 | 6.4 | 10.3 | 6.7 | 6.4 |
| pH, adjusted | — | — | — | — | 10.1 | — | 10.0 | — | 10.3 | 9.9 | — | 10.0 | 10.3 |
| API Filtrate, ml | 11.0 | 12.2 | 12.2 | 9.6 | 10.4 | 9.6 | 9.2 | 9.0 | 8.4 | 8.0 | 8.4 | 6.5 | 7.0 |
| Filtrate Color | CL | CL | CL | VLG | LA | LG | DA | G | DA | DA | A | VDA | DA |
| Cake Thickness, 32nd in. | 2 | 3 | 3 | 2 | 4 | 2 | 2 | 1 | 2 | 1 | 1 | 1 | 1 |
| Shear Strength, lb/100 | | | | | | | | | | | | | |

TABLE 7-continued

| VESSEL | E | | F | G | | | H | | | I | |
|---|---|---|---|---|---|---|---|---|---|---|---|
| sq. ft. | — | — | 260 | — | — | — | — | — | — | 150 | — | 95 |

1 - Properties measured initially
HR - Properties measured after rolling at 150° F. for 16 hours
SA - Properties measured after static aging at 300° F. for 16 hours
CL - Clear
G - Golden
A - Amber
DA - Dark Amber
V - Very
L - Light

EXAMPLE 5

This is not an example of the invention but is made for comparative purposes.

The procedure of Example 3, supra, is repeated except that the humate as added therein is replaced with an equal proportion of a commercially available lignite (Imco Lignite) having the composition:

| Element | Composition (%) |
|---|---|
| C | 53.86 |
| H | 3.92 |
| O | 24.27 |
| S | 1.39 |
| ash | 13.33 |
| Ti | 0.013 |
| Zr | 0.012 |
| Al | 0.31 |
| Fe | 0.32 |
| Ca | 0.13 |
| C/O ratio | 2.2:1 |
| C/H ratio | 13.7:1 | and a moisture content of 13.55 percent by weight. The results are given in Table 8, below, the vessels being identified by the letters O-S.

indicating a tendency toward severe gellation. This tendency was reduced by hot rolling, which may have allowed more of the thinner to become solubilized, and therefore available to deflocculate the clay. The increased darkening of the filtrate is an indication that the thinner was in solution in increasing concentrations. The amount of filtrate was generally lowered at increased thinner concentrations. As can be seen from Tables 6, 7 and 8, the humate samples gave superior thinning of the muds compared to lignite, as shown by the lower yield points and gel strengths obtained with the humate additives.

What is claimed:

1. A method of reducing the viscosity of a water-based drilling mud, which comprises;
    providing a quantity of humate, said humate having been associated with titanium mineral deposits and having a compositional make-up of carbon and hydrogen with a ratio (weight to weight) of 9.5–17.5:1.0; oxygen with carbon to oxygen (weight to weight) ratio of 1.0–2.3:1.0; an aluminum content of 2.8–8.4 percent by weight; a titanium content of 0.5–3.5 percent by weight and a calcium content of less than 0.5 percent by weight; and
    dispersing a viscosity reducing proportion of the humate in the water-based drilling mud;
    said mud comprising an aqueous suspension of clay.

TABLE 8

| VESSEL | O | | | P | | | Q | | R | | | S | |
|---|---|---|---|---|---|---|---|---|---|---|---|---|---|
| Sample Concentration lb/bbl | 0 | | | 1 | | | 3 | | 5 | | | 10 | |
| Caustic Soda, lb/bbl | 0 | 0 | 0 | 0.5 | 0.3 | 0.6 | 0.4 | 0.8 | 0.6 | 0.3 | 1.3 | 0.6 | 0.4 |
| MUD PROPERTIES | 1 | HR | SA | 1 | HR | 1 | HR | 1 | HR | SA | 1 | HR | SA |
| Fann VG Meter Readings: | | | | | | | | | | | | | |
| 600 rpm | 76 | 163 | 126 | 77 | 203 | 78 | 139 | 78 | 145 | 115 | 80 | 123 | 122 |
| 300 rpm | 58 | 122 | 95 | 58 | 138 | 55 | 91 | 54 | 92 | 75 | 52 | 76 | 80 |
| 200 rpm | 52 | 103 | 84 | 52 | 110 | 48 | 70 | 45 | 70 | 59 | 43 | 57 | 63 |
| 100 rpm | 45 | 81 | 70 | 43 | 74 | 40 | 47 | 35 | 44 | 40 | 30 | 35 | 42 |
| 6 rpm | 34 | 58 | 48 | 35 | 23 | 30 | 18 | 25 | 13 | 17 | 16 | 9 | 20 |
| 3 rpm | 34 | 58 | 48 | 29 | 21 | 30 | 17 | 25 | 13 | 16 | 15 | 8 | 20 |
| Apparent Viscosity, cp | 36 | 81.5 | 63 | 38.5 | 101.5 | 39 | 69.5 | 39 | 72.5 | 57.5 | 40 | 61.5 | 61 |
| Plastic Viscosity, cp | 18 | 41 | 31 | 19 | 65 | 23 | 48 | 24 | 53 | 40 | 28 | 47 | 42 |
| Yield Point, lb/100 sq. ft. | 40 | 81 | 64 | 39 | 73 | 32 | 43 | 30 | 39 | 35 | 24 | 29 | 38 |
| 10-sec Gel. lb/100 sq. ft. | 42 | 54 | 50 | 50 | 25 | 48 | 24 | 43 | 20 | 17 | 30 | 74 | 27 |
| 10-min Gel. lb/100 sq. ft. | 58 | 87 | 74 | 115 | 81 | 120 | 73 | 75 | 74 | 73 | 62 | 50 | 85 |
| pH, initial | 8.5 | 7.9 | 7.7 | 10.0 | 8.5 | 10.0 | 8.1 | 10.0 | 7.8 | 7.9 | 10.0 | 7.7 | 7.7 |
| pH, adjusted | — | — | — | — | 10.0 | — | 10.0 | — | 10.3 | 10.1 | — | 10.2 | 10.1 |
| API Filtrate, ml | 11.0 | 12.2 | 12.2 | 9.7 | 10.0 | 11.1 | 9.9 | 9.0 | 8.9 | 8.6 | 8.2 | 8.2 | 7.8 |
| Filtrate Color | CL | CL | CL | LG | LA | VLG | A | LA | DA | DA | A | VDA | VDA |
| Cake Thickness, 32nd in. | 2 | 3 | 3 | 2 | 4 | 2 | 3 | 1 | 2 | 2 | 1 | 1 | 1 |
| Shear Strength, lb/100 sq. ft. | — | — | 260 | — | — | — | — | — | 170 | — | — | 110 | |

1 - Properties measured initially
HR - Properties measured after rolling at 150° F. for 16 hours
SA - Properties measured after static aging at 300° F. for 16 hours
CL - Clear
G - Golden
A - Amber
DA - Dark Amber
V - Very
L - Light As shown in Table 8, thinning of the mud was seen at each of the concentrations tested. At the lower concentrations, very high 10 min gel strengths were noted, 2. In a water-based drilling fluid composition which comprises an aqueous suspension of clay, the improvement which comprises a viscosity reducing proportion of a humate, said humate having been separated from an association with a titanium mineral deposit and having a compositional make-up of carbon and hydrogen in a weight to weight ratio of 9.5–17.5:1.0; oxygen in a carbon to oxygen ratio of 1.0–2.3:1.0 (weight to weight); aluminum (2.8–8.4 percent by weight); titanium (0.5 to 3.5 percent by weight); and less than 0.5 percent by weight of calcium.

3. The improved composition of claim 2 wherein said proportion is within the range of from about 0.25 to about 25 pounds of humate per barrel of mud.

* * * * *